Aug. 22, 1939.   G. R. HARRISON   2,170,325
BATTERY HOLD-DOWN CLAMP AND METHOD OF MAKING THE SAME
Filed April 5, 1937
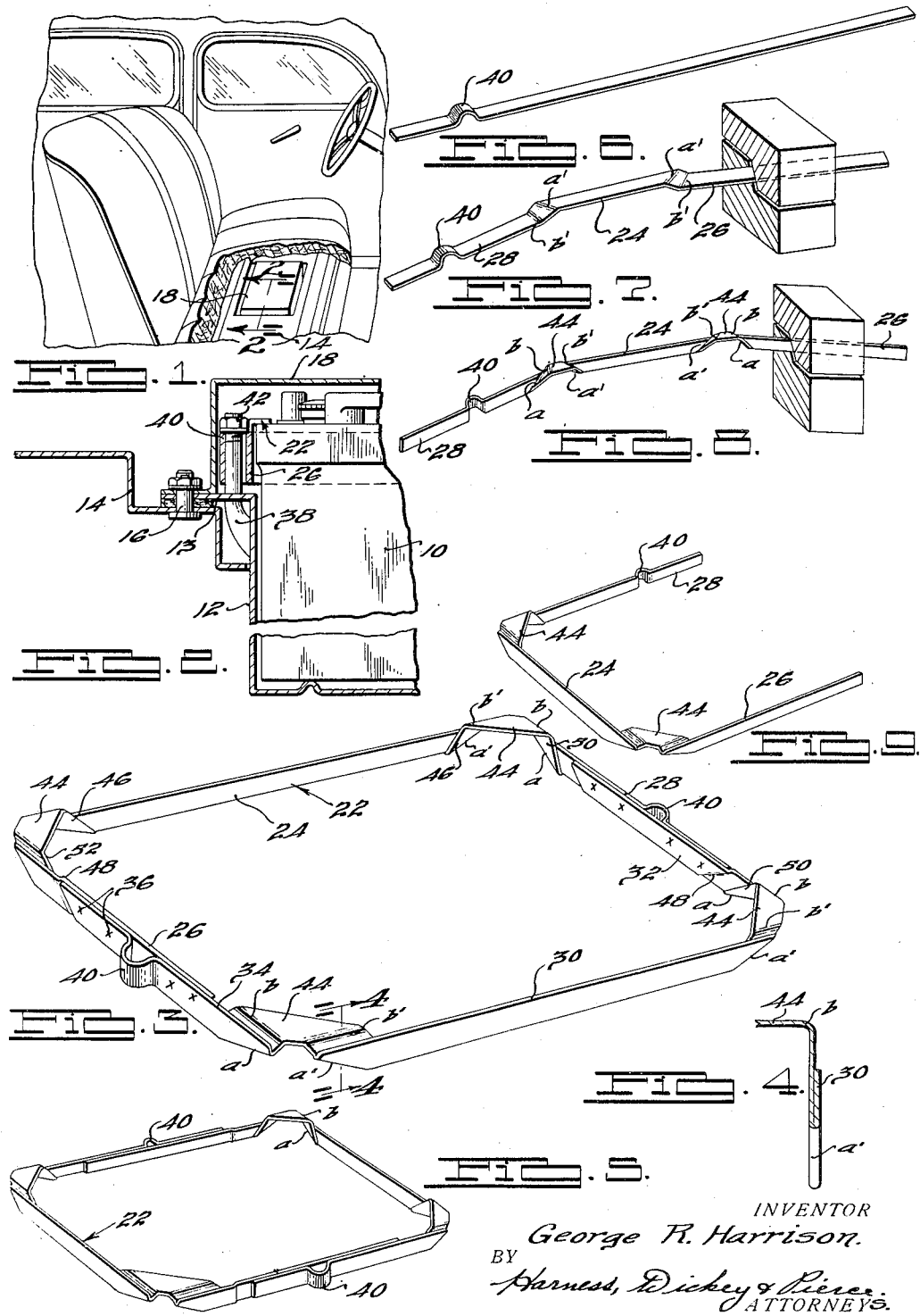
INVENTOR
George R. Harrison.
BY
Harness, Dickey & Pierce
ATTORNEYS.

Patented Aug. 22, 1939

2,170,325

UNITED STATES PATENT OFFICE 2,170,325

BATTERY HOLD-DOWN CLAMP AND METHOD OF MAKING THE SAME

George R. Harrison, Detroit, Mich., assignor to National Stamping Company, Detroit, Mich., a corporation of Michigan Application April 5, 1937, Serial No. 135,037

4 Claims. (Cl. 153—11)

The present invention relates to devices for holding articles in place, and in particular provides improved hold-down clamping means or frames adapted to be fitted over automobile storage batteries to hold them in place within supporting frames or containers therefor.

It will be appreciated from a complete understanding of the present invention, that it may be applied to holding down or otherwise cooperating with a wide variety of objects, and that the inventive features thereof may be embodied in widely differing forms. The preferred use of the invention, however, is as a so-called hold-down clamping or retaining frame for holding vehicle storage batteries in place within the frames or boxes ordinarily provided therefor, and the embodiment of the invention shown in the present application is specifically designed for this purpose.

In accordance with conventional practice, vehicle storage batteries are somewhat loosely received and supported within a frame, container or box provided therefor at a suitable point in the vehicle, such as beneath the front seat, beneath the front floor panel, or within the engine compartment. In order to secure the battery within the just mentioned frame or container, and to prevent rattling thereof, it is a common practice to provide a loop-like frame which fits over the top of the battery, and while exposing the upper surface thereof, serves with other means to clamp the battery in its frame or container. It has been proposed to form the hold-down or clamping frames of metal stampings, constituting a substantially continuous band of metal having a close fit around the battery, and having tabs or corner pieces which overlie the top of the battery. These hold-down or clamping frames also conventionally include means by which they may be bolted or otherwise secured to the battery box or its supporting structure.

Objects of the present invention are to provide a hold-down or clamping frame of the above generally indicated character, which may be more economically and rapidly produced than has heretofore been possible, and which may be more readily and quickly applied to a battery; to provide such a hold-down clamp or frame characterized as comprising a pair of similar strips suitably secured together to form a single continuous piece of metal of generally rectangular shape and having corner tabs or surfaces which overlie the surface of the battery or other device with which the same is associated; to provide such a frame in which the corner tabs or surfaces are integral with the body of the frame; to provide such a frame which may be formed of strips of metal of uniform width throughout their length, the corner tabs or surfaces being formed by folding the strips upon themselves; and to provide an improved method for effecting the forming and assembly of the frame.

With the above as well as other objects in view, which appear in the following description and in the appended claims, a preferred but illustrative embodiment of the invention is shown in the accompanying drawing, throughout which corresponding reference characters are used to designate corresponding parts, and in which:

Figure 1 is a view illustrative of one conventional arrangement of a battery containing device within the vehicle;

Fig. 2 is a fragmentary view partly in section, taken along the line 2—2 of Fig. 1;

Fig. 3 is a perspective view of the improved hold-down device or cover of the present invention;

Fig. 4 is a fragmentary view in section, taken along the line 4—4 of Fig. 3;

Fig. 5 is a perspective view of a modified embodiment of the invention; and

Figs. 6, 7, 8 and 9 are views which show preferred progressive steps in the formation of the improved frame.

In the illustrative arrangement shown, the usual vehicle storage battery 10 is received within a rectangular frame or box 12, suitably secured, through an overhanging flange 13 and one or more studs 16, to a member 14 which may constitute a part of the vehicle frame. Each stud 16 also acts as a securing means for a conventional battery box cover 18, which is provided to enclose the battery and protect the terminals thereof from exposure and from accidental contact. The battery 10, as will be noted, is loosely received within the box 12, and is retained in place and prevented from moving therein by the loop-like frame 22, to the construction of which the present invention is particularly directed.

Referring particularly to Figs. 3 and 4, it will be noted that the frame 22 is formed of two identical strips of metal, each bent into generally U-shape, and secured together by welding along the respective legs thereof. One of the strips of metal is provided with a bight portion 24, and leg portions 26 and 28. The other strip comprises a bight portion 30, and leg portions 32 and 34, which correspond respectively to the previously mentioned legs 26 and 28. Legs 26 and 34 overlap each other and are secured together in any suitable way as by spot welding at a plurality of points 26, and legs 28 and 32 are correspondingly secured together. In order to accommodate the retaining studs such as 38 (Fig. 2), which project from box 12 in the particular embodiment shown and by which the hold-down frame or cover is held in place, the legs 28 and 34 are each initially provided with a struck-out portion 40, which with the adjacent portion of the associated other leg, constitute eyelets. The nut 42 or other retaining device which is turned down over each stud 38, may bear directly upon the upper edges of the legs 34 and 26 and 28 and 40, or if desired, suitable washers or bushings may be interposed therebetween as will be appreciated.

In the course of their formation into U-shape, and prior to the time that they are secured together, the two strips of metal constituting the frame 22 are individually formed to provide the corner tabs or surfaces 44 which, as more clearly appears in Fig. 2, overlie and bear upon the associated corners of the battery 10, and prevent it from moving upwardly out of the box 12. Each corner tab 44 is formed by reversely bending the metal of the associated strip along the diagonal lines designated $a$, $a'$, $b$ and $b'$ and presents a horizontal bearing surface which may bear directly upon the surface of the battery.

It is noted that the inner faces of the folded portions 46 at each side of the frame lie in the same plane. Also, due to offsets provided at 48 in the end sections 26 and 32, of substantially the thickness of these strips, the end portions 32 and 50, and 26 and 52 also lie in substantially the same planes respectively. The inner surfaces of the frame accordingly, which engage the battery 10 with a relatively snug fit, define an accurately rectangular structure. It will be further noted that the application to the battery 10 of the frame 22 is facilitated by the fact that the undersides of all of the folds are rounded.

In use the frame 22 may, of course, be fitted over the battery 10 either before or after the battery 10 is inserted within the container 12 and the final assembly step consists in tightening down the nuts 42 on the hold-down studs. In the completely assembled position, the relatively snug fit between the sides of the battery and the sides of the frame serves to effectively prevent any lengthwise or sidewise movement of the battery within the container, and the corner tabs 44 effectively prevent any vertical movement of the battery within the container.

The arrangement of Fig. 3 is one in which the studs 38 project from the ends of the container 12 and, accordingly, the eyelets defined by the portions 40 are located at the ends of the frame 22. In certain instances it is found more convenient to locate the studs 38 at the sides of the battery box or container and in such instances the structure of Fig. 5 may be utilized. This arrangement corresponds in all respects to the previously described arrangement except that the eyelet portions 40 are located at the sides instead of at the ends of the frame, this difference being effected by increasing the length of the leg sections reative to the length of the bight sections.

The preferred method of forming the individual strips which are secured together in the previously indicated manner to constitute the complete frame 22 is illustrated in the progressive views of Figs. 6, 7, 8 and 9.

The first step preferably consists in forming by a suitable stamping operation the struck-out portion 40 (Fig. 6), the location of this portion 40 between the ends of the strip being determined in accordance with the desired ultimate location of the bolt receiving eyelets.

The second forming step preferably consists in bending the strip along the fold lines $a'$ and $b'$, the folding operation being carried to such an extent that the included angles between the adjacent sides are of the order of 130° to 150°. This folding operation brings the strip to the form shown in Fig. 7 and defines the bight portion 24 and the leg portions 26 and 28.

The third forming step preferably consists in introducing the additional folds along the lines $a$ and $b$, bringing the strip to the form shown in Fig. 8. This third folding step as will be appreciated serves to define the corner tabs or surfaces 44, the folding operation being carried to substantially the extent mentioned in connection with the second step.

The final forming step brings the strip to the U-shaped form shown in Fig. 9, in which it is in readiness to be connected to a duplicate companion strip as by the previously mentioned spot welding operation. This final step is preferably effected by gripping the strip between suitable dies and increasing the angles of fold until the angle of fold at each line $b$ and $b'$ is of substantially 90°, and until the surfaces adjacent each fold line $a$ and $a'$ are closed upon and abut each other. The final folding along the lines $a$ and $a'$ may, if desired, be effected by a hammer operation.

In order to simplify the drawing no attempt has been made to show in detail the die structures involved in effecting the several folding operations described with reference to Figs. 6, 7, 8 and 9, it being appreciated that these dies will be constructed in the form complemental to the desired form to be produced in each step.

Although a specific embodiment of the invention, both as to structure and as to the method, has been described in detail it will be appreciated that various modifications in the structure and various changes in the method may be effected within the spirit and scope thereof.

What I claim is:

1. A holding device adapted to overlie adjacent angularly related sides of an article and having a portion adapted to overlie the top or bottom surface of the article, comprising a unitary substantially planar strip having leg portions and a corner portion therebetween, each leg portion being disposed to overlie and being individual to a corresponding side, each leg portion terminating in a plurality of bends extending transversely thereacross in such angular relation to each other that the corner portion of the strip between the respective bends extends diagonally across the corner defined between the leg portions and is disposed to overlie the said surface.

2. A holding device adapted to overlie adjacent angularly related sides of an article and having a portion adapted to overlie the top or bottom surface of the article, comprising a unitary substantially planar strip having leg portions and a corner portion therebetween, each leg portion being disposed to lie flatwise against and being individual to a corresponding side, each leg portion terminating in a pair of respectively opposite bends, and the corner portion of the strip between the pairs of bends extending diagonally across the corner defined between the leg portions and being disposed to lie flatwise upon the said surface.

3. A holding device for an article having rectangularly related sides and a top or bottom surface, including a pair of similar U-shaped substantially planar strips, the ends whereof are secured together to form a rectangular frame, the part of the strip on either side of each corner being disposed to overlie the corresponding side of the article and terminating in a plurality of bends extending transversely thereacross in such angular relation to each other that the portion of the strip between the respective bends extends diagonally across the associated corner and is disposed to overlie the said surface.

4. The method of forming a corner having an inwardly projecting tab in a strip which includes forming two pairs of spaced bends in said strip, the bends of one pair extending across the strip in opposite angular relation to the bends of the other pair, and bringing the ends of the strip into desired angular relation to each other while forming each outer bend into a fold and forming each inner bend into substantially a right angle, so as to define a corner between the ends of the strip, the portion of the strip between the inner bends extending diagonally across said corner and constituting said tab.

GEORGE R. HARRISON.